United States Patent [19]
Lee et al.

[11] Patent Number: 6,151,426
[45] Date of Patent: Nov. 21, 2000

[54] CLICK AND SELECT USER INTERFACE FOR DOCUMENT SCANNING

[75] Inventors: Jeffrey P. Lee, Greeley; Patricia D. Lopez, Loveland; Steven J. Simske, Greeley, all of Colo.

[73] Assignee: Hewlett-Packard Company, Palo Alto, Calif.

[21] Appl. No.: 09/164,693

[22] Filed: Oct. 1, 1998

[51] Int. Cl.$^7$ .................................................. G06K 9/00
[52] U.S. Cl. ............................................................. 382/319
[58] Field of Search .................................... 382/305, 306, 382/311, 312, 318, 319; 358/537, 538, 462, 464; 707/517, 520, 521, 526, 527, 530; 345/118, 131, 133, 326, 328, 339, 340, 341, 342, 343, 347

[56] References Cited

U.S. PATENT DOCUMENTS 5,596,655   1/1997   Lopez ....................................... 382/173

OTHER PUBLICATIONS

Theo Pavlidis and Jiangying Zhou, "Page Segmentation and Classification," Document Image Analysis, pp. 226–238, (Lawrence O'Gorman and Rangachar Kasturi, IEEE Press1995). , Anil K. Jain and Bin Yu, "Documentation Representation and Its Application to Page Decomposition," Pattern Analysis and Machine Intelligence, pp. 294–308, (vol. 20, No. 3, Mar. 1998).

*Primary Examiner*—Jose L. Couso

[57] ABSTRACT

A user interface for scanner software that allows a variable resolution preview scan of a document to be presented to the user in a preview box within a scanner software window. The user clicks on a point within the preview scan, and the classification of the image immediately around the click point is determined. A selection marker is automatically drawn around the selected image, and all portions of the preview scan outside the selection marker are grayed out. Based on the classification, adjustments are made automatically, and windows having control tools for adjusting various aspects of the selected image are automatically enabled or disabled. Once the desired area is properly selected and any adjustments have been made, the user can drag and drop the selected image with a mouse onto the desktop, a folder, or an open application to launch an optimized final scan of the selected image.

32 Claims, 8 Drawing Sheets

CLICK AND SELECT USER INTERFACE FOR DOCUMENT SCANNING

CROSS REFERENCE TO RELATED APPLICATIONS

This application is related to application Ser. No. 09/164,795 of Theodore W. Neff et al. filed Oct. 1, 1998 entitled User Interface for Initiating a Final Scan Using Drag and Drop.

TECHNICAL FIELD

This invention relates to document scanners and more particularly to the user interface for document scanners. Even more particularly, the invention relates to a user interface that allows a user to automatically select a region of interest from a preview scan of a document.

BACKGROUND OF THE INVENTION

Current scanner technology allows a user to capture and utilize all or portions of various scanned documents, images, objects, etc. for use within various computer applications, even when the documents are comprised of a variety of different components. A document containing text, black and white and/or color photographs, graphics, and color and black and white line art can be scanned in its entirety. Alternatively, the user may choose to select only certain portions of the original document for scanning by utilizing scanner software to select an area or particular image contained in a preview scan of the document. The selected area is then scanned to produce a final image.

The usability of existing scanners and their associated user interface for selecting portions of documents has been hindered by the inability of many users to understand the simple concept of drawing a selection box around the image of interest in a preview scan of the document displayed in a window in a computer monitor indicating what will be scanned for a final image. The result is that, in many situations, the user scans the entire document when only a portion was actually needed. Typically, the user will then visually crop the image of interest from the entire scanned document in an application, such as a word processor or an Adobe PhotoShop™ editing type application. Thus, valuable file space, as well as precious time, are wasted.

Existing solutions tend to stress automaticity at the expense of user flexibility, or else simplicity at the expense of accurate region finding and definition. The former is exemplified by scanners in which default regions are provided by an automated page analysis technology that can annoy users interested in selecting only certain portions of a scanned document. The latter is exemplified by scanners in which relatively simple pages cannot be readily subdivided into appropriate regions of different types (e.g., text, drawings, and images). The present invention allows the user an intermediate solution, in which the automaticity of region selection is controlled by the user's clicking of a mouse within the region they wish to be automatically selected. The user then has the ability to readily override the first estimate of the bounding box, if it proves to be incorrect, by using the user interface.

It is thus apparent that there is a need in the art for an improved method or apparatus which solves the objects of the invention. The present invention meets these and other needs in the art.

This application is related to application Ser. No. 09/164,795 of Theodore W. Neff et al. filed Oct. 1, 1998 entitled User Interface for Initiating a Final Scan Using Drag and Drop, which is incorporated herein by reference for all that is disclosed and taught therein.

DISCLOSURE OF THE INVENTION

It is an aspect of the present invention to click with a mouse on a point within a region or image of interest in a preview scan of a document to automatically select the region or image of interest for an optimized re-scan of the region or image of interest.

It is another aspect of the invention to initiate with scanner software a variable resolution preview scan of the document, and present the preview scan data of the document in a variable resolution preview window of a computer monitor.

Yet another aspect of the invention is to display a selection marker around the selected region or image of interest in the variable resolution preview window in the computer monitor.

Still another aspect of the invention is to evaluate the region or image of interest and classify it by type, such as text, grayscale image, color image, or black and white image.

A further aspect of the invention is to gray out those areas outside of the region or image of interest bounded by a selection marker.

A still further aspect of the invention is to enable or disable windows having tools for adjusting various aspects of the selected region or image of interest bounded by a selection marker prior to initiating a re-scan of the selected region or image of interest.

Another aspect of the invention is to resize the initial region or image of interest selected by simultaneously clicking on a point and holding down a control key on a keyboard to either expand the region or image of interest to include additional area, or contract the region or image of interest to exclude area already selected.

A still further aspect of the invention is to resize the initial region or image of interest selected by right clicking on the mouse to open a context menu, and select an expand selection option or select a contract selection option from the menu.

Yet still another aspect of the invention is to deselect a region or image of interest bounded by a selection marker by clicking in an appropriate area of white space within the preview scan.

The above and other aspects of the invention are accomplished in a user interface for scanner software that allows a variable resolution preview scan of a document to be presented to the user in a variable resolution preview window of a computer monitor. The user may then click on a point within a region of interest in the variable resolution preview scan data in the variable resolution preview window. Based on the characteristics of the data represented at the click point, an area is determined that encompasses the click point and the neighboring points that have similar characteristics to that of the click point. This area is then classified by type based on the characteristics of the data represented within the area, such as text, grayscale image, color image, or black and white image. A selection marker is then automatically displayed around the area as a first estimate of what the user intended by making the mouse click at the click point.

The selection marker may be a bounding box rectangular in shape. For non-rectangular "lasso" regions, image analysis software may be applied, automatically tracing around the lasso region of interest. Portions of the scanned document that lie outside the selection marker are grayed out. Based on the determination of the type of area, adjustments are made automatically to data type, exposure, color, resolution, and sharpness settings that normally would have to be made manually by the user in prior art systems.

If the selection marker automatically generated does not represent the image of interest desired by the user, the user can adjust the size of the region of interest to include more area or include less area in several different ways. One such way is by dragging the selection area handles appropriately, expanding or contracting the selected area. Or, the user may simultaneously click on a point and hold down a control key on a keyboard, or right click on the mouse, to either expand the region or image of interest to include additional area, or contract the region or image of interest to exclude area already selected. The user may also right click on the mouse to pop up a context menu, and select an expand selection option or select a contract selection option from the menu. In addition, a different region of interest can be selected by the user by clicking in an unselected area of the variable resolution preview scan, and dragging the mouse to create a rectangular area bounded by a selection marker.

Based on the type of image, windows having tools for adjusting various aspects of the selected area are automatically enabled or disabled from user input. Once the region of interest is properly selected, and any adjustments have been made, the user can use a mouse to drag and drop the selected area onto the desktop, a writeable folder, or onto an open application to launch an optimized final scan, or re-scan, of the selected area. After the optimized final scan, the resulting image data resides in the desktop, folder, in a file, or within the open application. Alternatively, the user may utilize pull down menus or buttons to launch the optimized final scan. However, if the pull down menu is used, save to file, copy to clipboard, and print are the only options available. Thus, the resulting image data will not automatically appear in an open application if this option is utilized.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
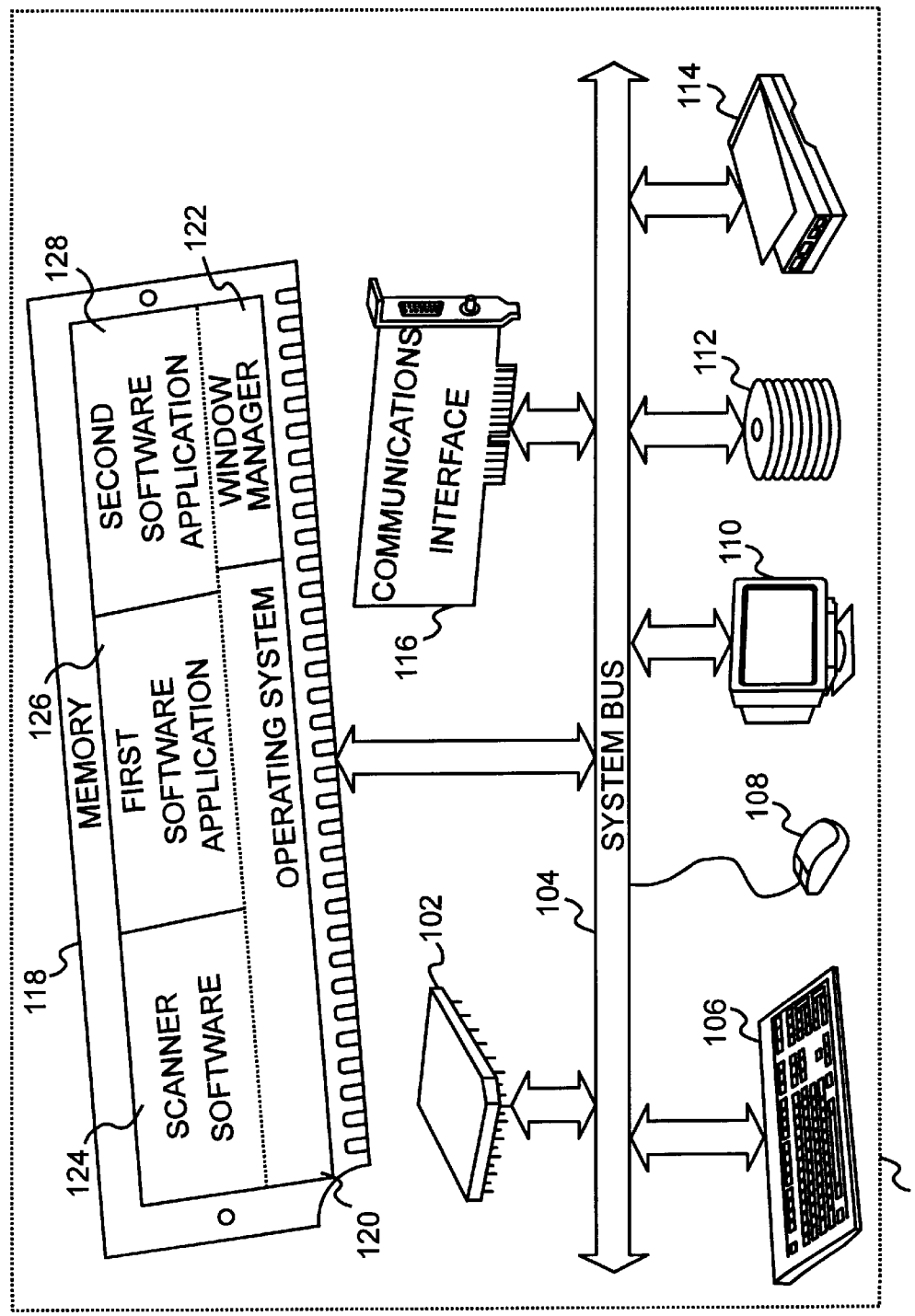
FIG. 1 shows a block diagram of a computer system incorporating the user interface for scanner software of the present invention.

FIG. 1 shows a block diagram of a computer system incorporating the user interface for scanner software of the present invention. One skilled in the art will recognize that many other configurations are possible for accessing a scanner with a computer system. Only one configuration is shown for simplicity. Referring now to FIG. 1, computer system 100 contains a processing element 102. Processing element 102 communicates with other elements of computer system 100 over a system bus 104. A keyboard 106 allows a user to input information into computer system 100 and a monitor 110 allows computer system 100 to output information to the user. A graphical input device 108, commonly a mouse, is also used to input information. Scanner device 114 is also used to input information to computer system 100.

Storage device 112 is used to store data and programs within computer system 100. Communications interface 116, also connected to system bus 104, receives information from sources outside of computer system 100. A memory 118, also attached to system bus 104, contains an operating system 120, window manager 122, and scanner software 124 having the user interface for scanner software of the present invention. In the preferred embodiment of the invention, operating system 120 is the Microsoft Windows® operating system. Memory 118 also contains first software application 126 and second software application 128. One skilled in the art will recognize that many more software applications could reside in memory 118. Only two are shown for simplicity.

Figure 2:
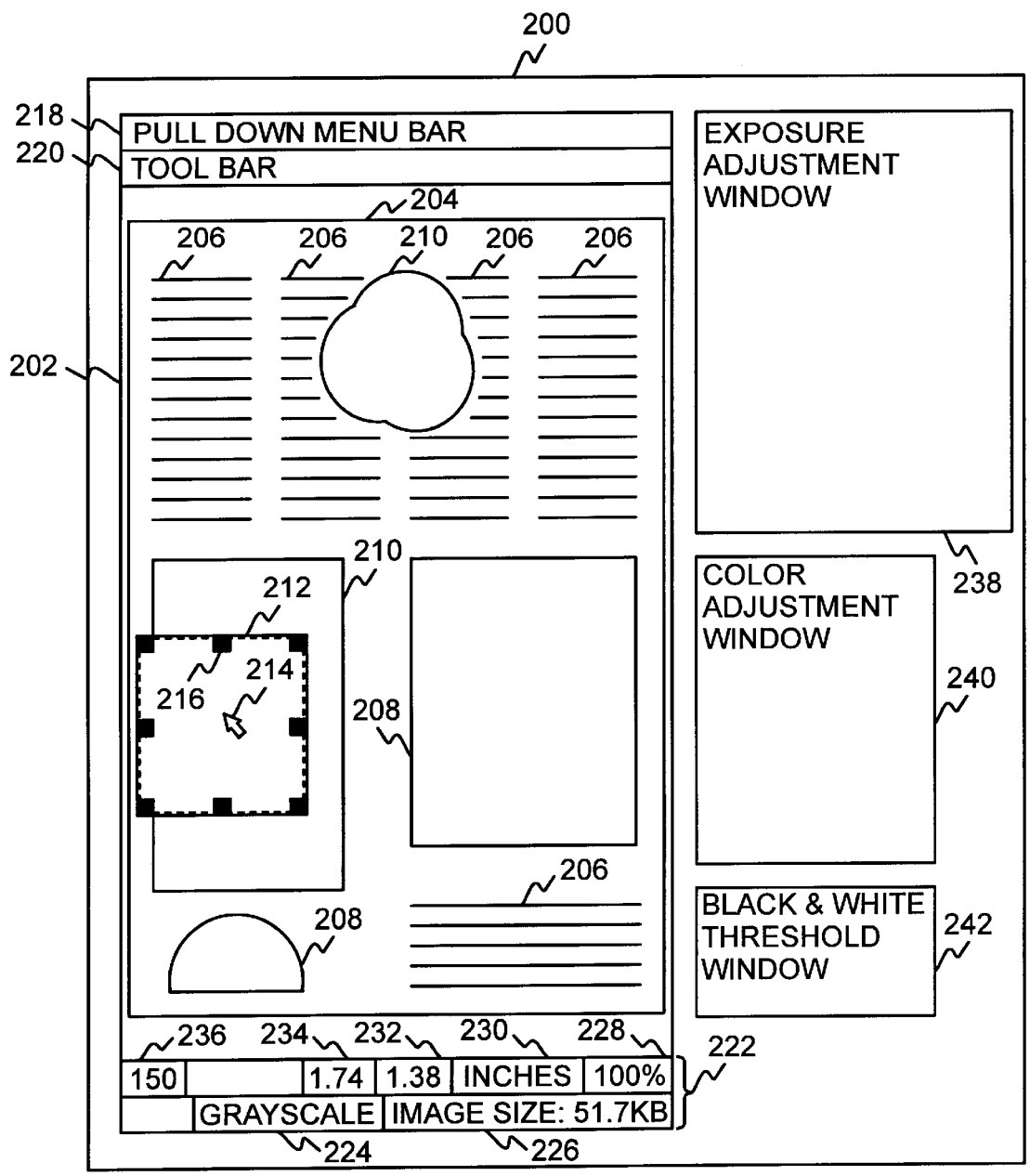
FIG. 2 shows a representation of the screen display of a computer monitor showing the user interface for scanner software of the present invention.

FIG. 2 shows a representation of the screen display from monitor 110 (FIG. 1) showing the user interface for scanner software 124 (FIG. 1) of the present invention. Referring now to FIG. 2, scanner software window 200 shows a variable resolution preview window 202 containing variable resolution preview scan 204 of a document that has been positioned on the flatbed of scanner device 114 (FIG. 1). A user initiates a variable resolution preview scan 204 by pressing a preview scan mode button on scanner device 114 (FIG. 1), or through a scan button or pull down menus presented to the user on monitor 110 through scanner software 124, which sends a signal causing scanner device 114 to use a preview scan mode to scan the document. A preview scan mode is typically a low resolution scan, dependent on the resolution of the display and the size of the preview window. A user may also initiate a zoom scan of an area of the document positioned on the flatbed, in which case the resolution of the data contained in variable resolution preview window 202 may be that of the scanner, which could be a considerably higher resolution than the preview scan mode. The data generated from the variable resolution preview scan is displayed as variable resolution preview scan 204 in variable resolution preview window 202. Variable resolution preview scan 204 shows regions of various types, including text regions 206, black and white line art regions 208, color photograph regions 210, and gray scale photograph region 212, which is partially superimposed on one of the color photograph regions 210.

A user has moved pointer 214 within gray scale photograph region 212 with graphical input device 108 (FIG. 1)

and has subsequently clicked on graphical input device 108. Scanner software 124 receives the click input, with pointer 214 in the shown location, and determines a boundary for the region surrounding the click point, and what data type of region is within the boundary. Alternatively, a user can accomplish the above manually by moving pointer 214 to a corner of gray scale photograph region 212, and then clicking and dragging graphical input device 108 to encompass gray scale photograph region 212 and then manually setting the data type via a pull down menu. In either case, variable resolution preview window 202 is updated with selection marker 216 drawn around the region identified as gray scale photograph region 212. In this example, selection marker 216 is a rectangular bounding box. The rest of the area of variable resolution preview scan 204 outside of gray scale photograph region 212 is grayed out (not shown in FIG. 2).

Variable resolution preview window 202 also contains pull down menu bar 218 and tool bar 220, which provide the user with access to various functions of scanner software 124. If no region has been selected, status bar 222 displays information regarding variable resolution preview scan 204 in its entirety. If a region has been selected, as shown in FIG. 2, status bar 222 displays current information regarding the region selected, which in this example is gray scale photograph region 212. Box 224 indicates that the region selected is a gray scale photographic image. Box 226 indicates the image file size is 51.7 KB. A scaling factor of 100% is shown in box 228. A different scaling factor may be displayed if an inter-application communication link, such as TWAIN or OLE, has been established indicating a preferred final size of the region of interest, or if the user has specified one. Box 230 indicates that the selected image is measured in inches. The user may also make a "units" preference for Box 230 other than inches, such as centimeters, points, or pixels. Box 232 indicates that the selected image is 1.38 inches high, and box 234 indicates that the selected image is 1.74 inches wide. Box 236 indicates a current resolution of 150 dpi.

Three floating windows are also shown in scanner software window 200 that present control tools to the user. The controls reflect adjustments made to variable resolution preview scan 204 based on the contents of the preview window. The user may use the tools presented in the floating windows to further manipulate a selected region of interest.

Exposure adjustment window 238 offers control tools that apply to all photographic output data types to preserve highlight and shadow detail. Color adjustment window 240 applies only to color photographic output data types to adjust hue and saturation. Black and white threshold window 242 applies only to black and white binary output data types such as line art, clip art, halftones, and text.

Figure 3A:
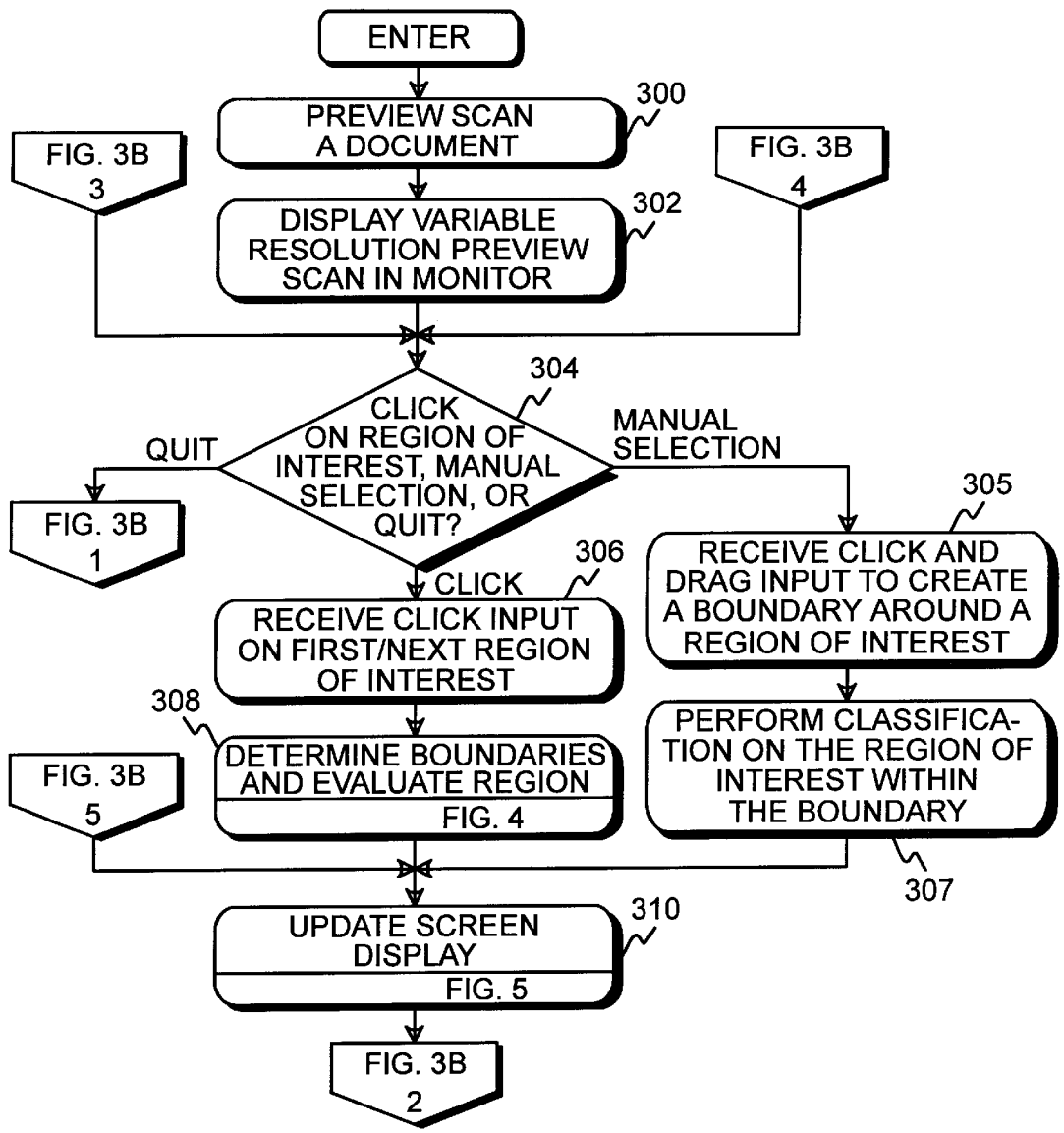
FIG. 3A and FIG. 3B show a block diagram of the overall flow of the operation of the user interface for scanner software of the present invention.
Figure 3B:
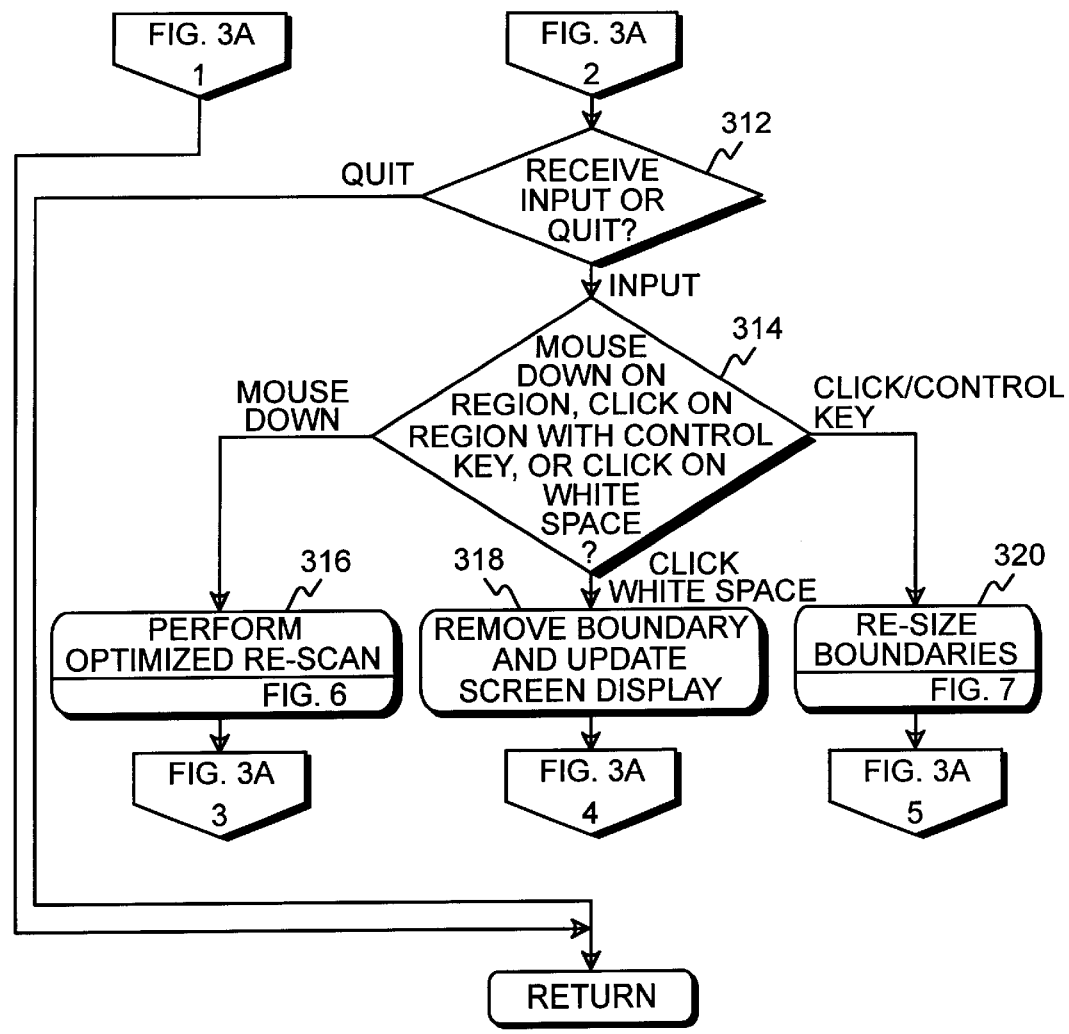

FIG. 3A and FIG. 3B show a block diagram of the overall flow of the operation of the user interface for scanner software of the present invention. The user interface is called from scanner software 124 (FIG. 1), when requested by the user of the scanner software 124. Scanner software 124 performs other scanner functions which are not part of the invention.

Referring now to FIG. 3A and FIG. 3B, after entry, in step 300 a variable resolution preview scan is initiated for a document placed in the flatbed of scanner 114 (FIG. 1) that may contain text, line art, and/or color and black and white photographic images of interest. In step 302, variable resolution preview scan 204 (FIG. 2) is displayed within variable resolution preview window 202 (FIG. 2) in monitor 110 (FIG. 1).

Step 304 determines if click input from graphical input device 108 (FIG. 1) on a region of interest within variable resolution preview scan 204 is received, or if a manual selection is made by clicking in an unselected area and dragging the mouse to create a rectangular selection area, or if an indication to quit the user interface is received. If the latter is true, FIG. 3 returns to scanner software 124. If a manual selection is made, then in step 305 the click and drag input establishing a boundary around a region of interest is received. Then in step 307 scanner software 124 performs classification analysis on the set of data elements contained within the boundary established by step 305, as more fully explained in FIG. 4.

If click input is received in step 304, then in step 306 click input on a region of interest is received by scanner software 124. Step 308 calls FIG. 4 which evaluates the region surrounding the click point to determine its boundary and its image type. After returning from FIG. 4, step 310 then calls FIG. 5 to update the screen display of monitor 110. After returning from FIG. 5, step 312 determines if further input, or an indication to quit the user interface, is received. If the latter is true, FIG. 3 returns to scanner software 124. If the former is true, then step 314 determines what type of further input was received. If the input received was a "mouse down" input signal selecting the region of interest for a potential drag and drop from graphical input device 108, then step 316 calls FIG. 6 to potentially perform an optimized final scan of the region of interest. After returning from FIG. 6, control returns to step 304 where another region of interest may be selected, or input received to quit the user interface.

If the input determined in step 314 was click input from graphical input device 108 on white space within variable resolution preview scan 204, then in step 318 scanner software 124 removes selection marker 216 that was placed around the region of interest. This action de-selects the current image selected. All portions of variable resolution preview scan 204 that had been grayed out are restored and the display in variable resolution preview window 202 (FIG. 2) in monitor 110 is updated. Control then returns to step 304 where another region of interest may be selected, or input received to quit the user interface.

Figure 7:
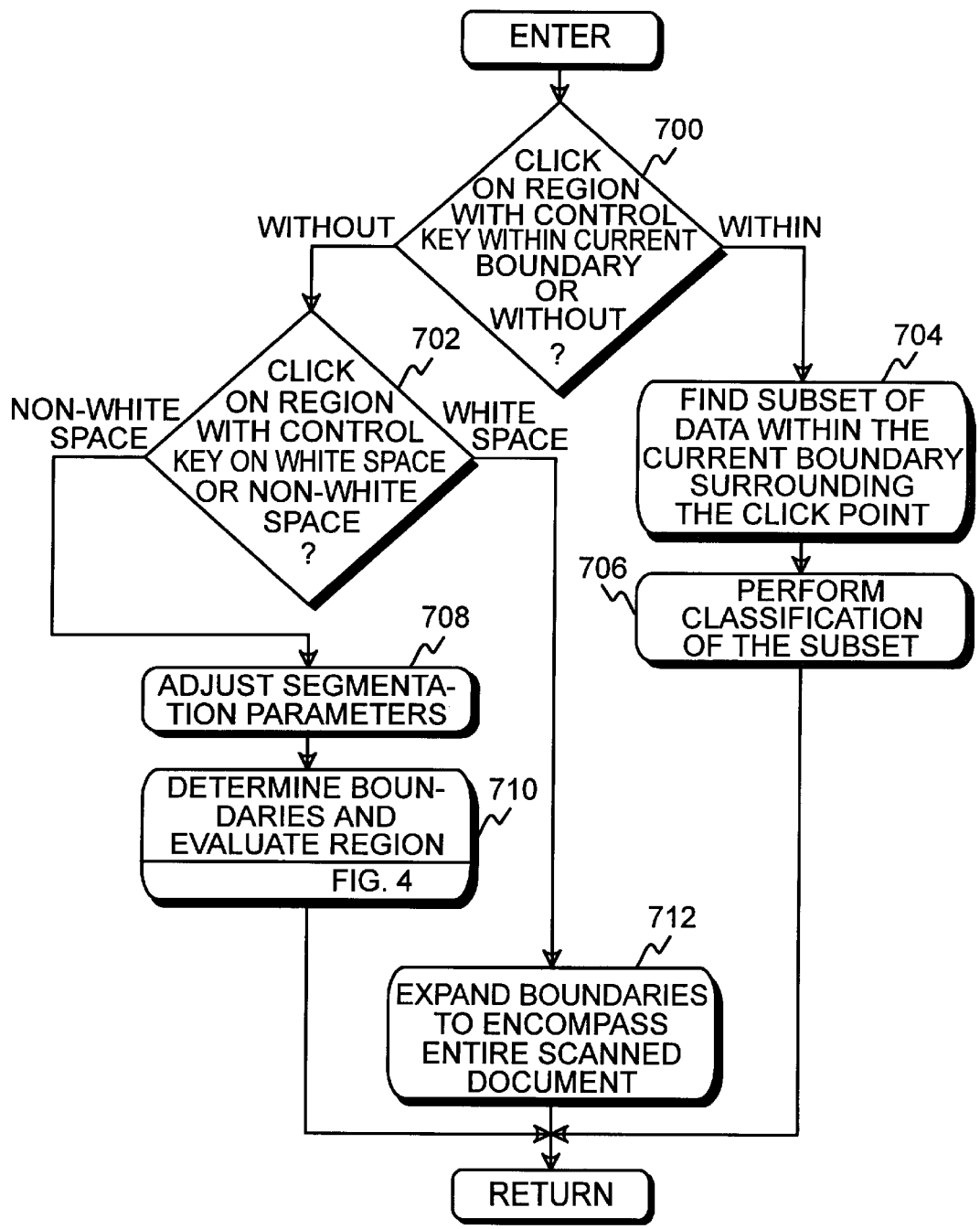
FIG. 7 shows a block diagram for re-sizing the boundary of a region of interest.

Finally, if the input determined in step 314 was click input on a region simultaneous with a control key held down, then step 320 calls FIG. 7 to re-size the boundary of the region of interest. After returning from FIG. 7, control returns to step 310, which is a call to FIG. 5 to update the screen display of monitor 110.

Figure 4:
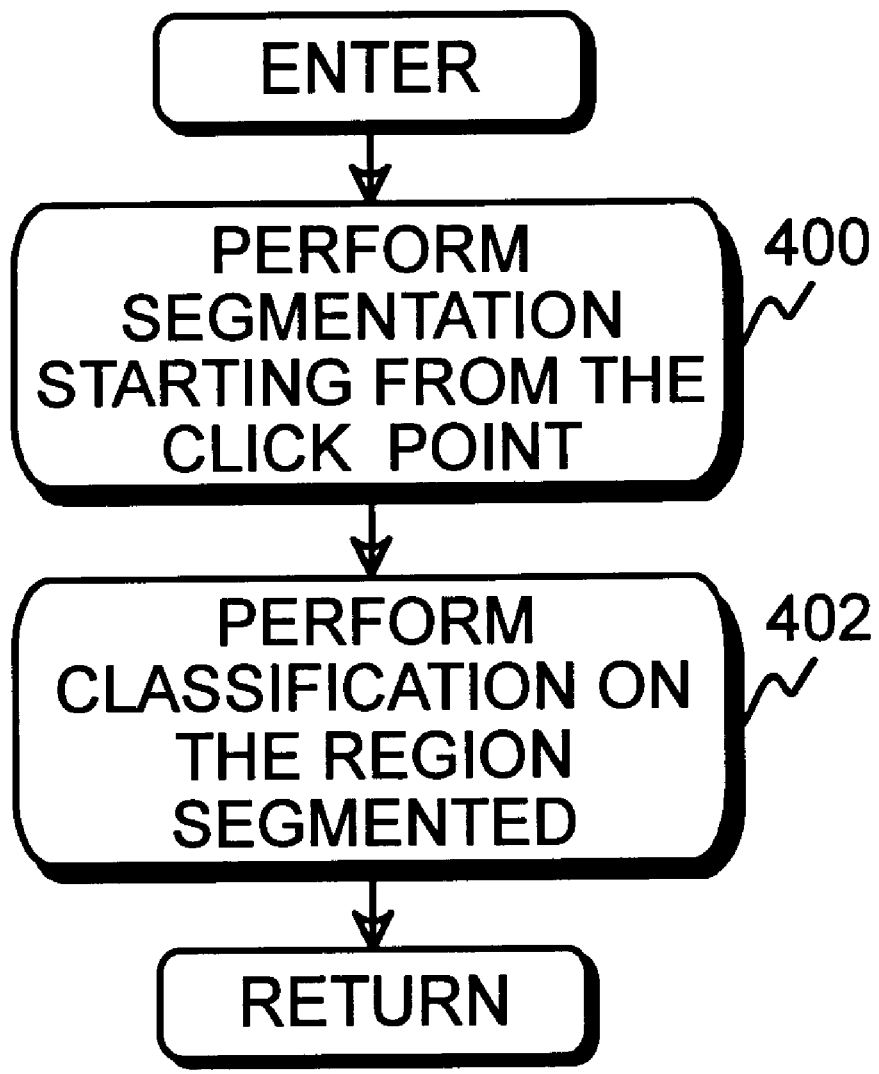
FIG. 4 shows a block diagram for determining the boundary of the region of interest and classifying the type of data within the region of interest.

FIG. 4 shows a block diagram for determining the boundary of the region of interest and classifying the type of data within the region of interest. Referring now to FIG. 4, after entry, scanner software 124 performs an analysis on the data elements from variable resolution preview scan 204 on the immediate region around the point clicked to determine the boundary of the region of interest and the data type within the region of interest. In step 400, segmentation analysis is performed to determine the boundary of the region of interest. Various techniques are well known in the art for performing segmentation analysis, falling into three broad categories: top down strategy (model-driven), bottom up strategy (data-driven), and hybrid. For example, see Theo Pavlidis and Jiangying Zhou, *Page Segmentation and Classification*, published in Document Image Analysis, pp 226–238, (Lawrence O'Gorman and Rangachar Kasturi, IEEE Press, 1995). Also, see Anil K. Jain and Bin Yu, *Documentation Representation and Its Application to Page Decomposition*, published in Pattern Analysis and Machine Intelligence, pp 294–308, (Volume 20, No. 3, March 1998). In the preferred embodiment of the invention, a bottom up strategy is employed, utilizing the data element at the click point as the beginning of the segmentation extension analysis. However, segmentation is not performed on the entire scanned document as is typically done, but is halted after the boundary for the region of interest surrounding the click point has been determined. The region of interest contains a set of data elements from the variable resolution preview scan, and the boundary is determined by the set of connected outermost data elements.

If the region of interest is rectangular in nature, extension is performed along a linear front, resulting in a selection marker that is a rectangular bounding box. For non-rectangular "lasso" regions of interest, extension is performed along a non-linear front, resulting in a selection marker that is a "lasso" around the region of interest.

After performing segmentation analysis, in step 402 scanner software 124 performs classification analysis on the set of data elements contained within the boundary established by step 400. Various techniques, also well known in the art for performing classification analysis, are also disclosed in the two articles cited above. In the preferred embodiment of the invention, the classification method used is that disclosed in U.S. Pat. No. 5,596,655 issued to Patricia D. Lopez on Jan. 21, 1997. Upon completion of classification analysis, FIG. 4 then returns to FIG. 3A.

Figure 5:
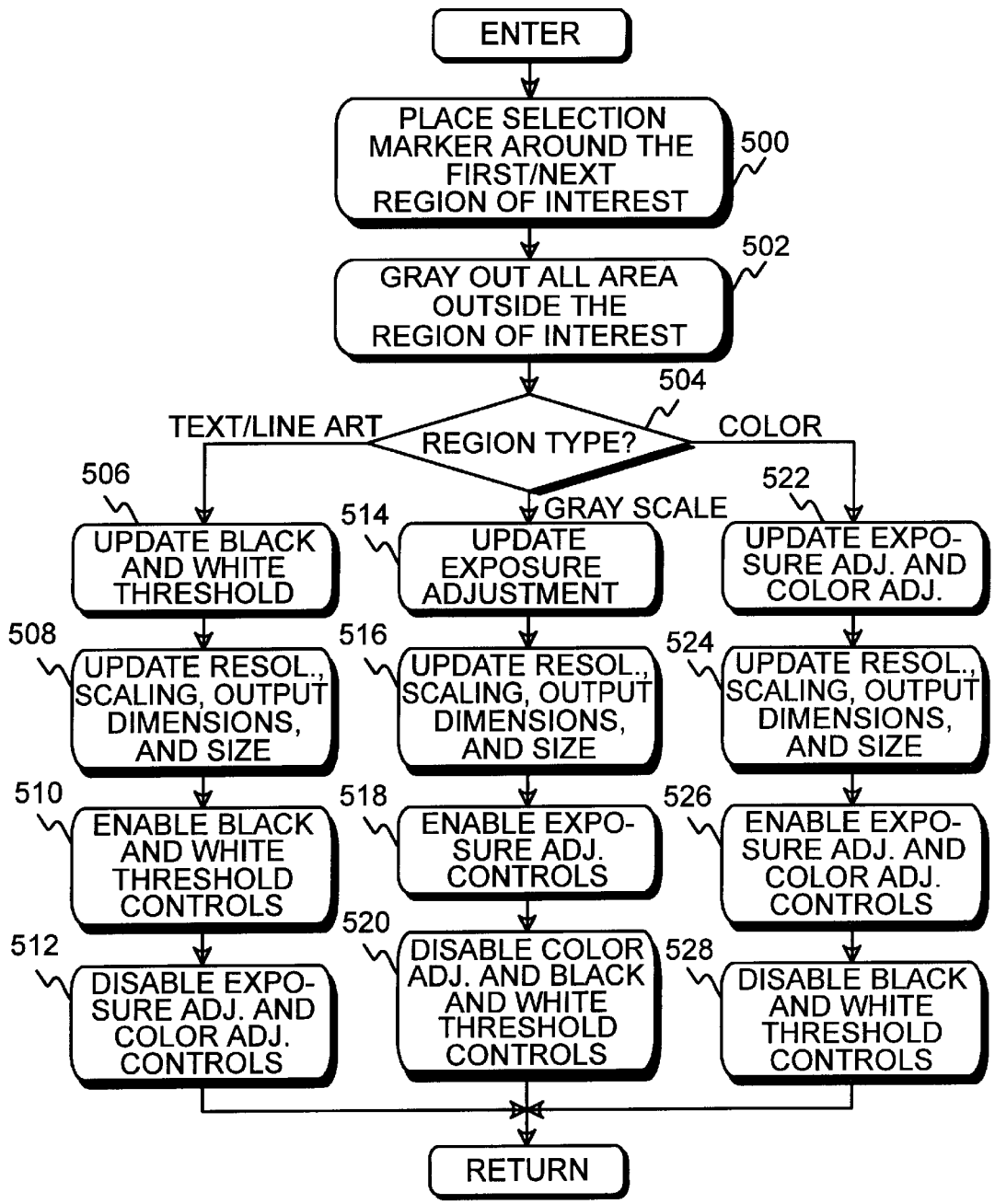
FIG. 5 shows a block diagram for updating the screen display of a computer monitor based on the selected area and its type.

FIG. 5 shows a block diagram for updating the computer monitor display based on the selected area and its data type. Referring now to FIG. 5, in step 500 a selection marker is displayed in variable resolution preview scan 204 (FIG. 2) in monitor 110 (FIG. 1) around the region of interest determined from either FIG. 4 or from FIG. 7, which is discussed below. If a selection marker is already displayed when FIG. 5 is called, that selection marker is removed from display before displaying the next selection marker. In step 502 the remainder of variable resolution preview scan 204 lying outside of the region of interest bounded by the currently displayed selection marker is grayed out.

Step 504 determines the data type of the region of interest. If the data type in the region of interest is text or black and white line art, then control passes to step 506 where scanner software 124 updates the output in black and white threshold window 242 (FIG. 2). In step 508 scanner software 124 updates the resolution, scaling, output dimensions, and file size within status bar 222 (FIG. 2). In step 510 the controls in black and white threshold window 242 (FIG. 2) are enabled for user input. The user may make manual changes using the controls that have been enabled prior to initiating a re-scan of the selected region of interest. In step 512 the controls for exposure adjustment window 238 (FIG. 2) and color adjustment window 240 (FIG. 2) are disabled from user input, and are grayed out. Thus, the steps in steps 506, 508, 510, and 512 automatically make many of the adjustments that the user would normally have to make manually in other prior art scanning systems after selecting an image for scanning. The current invention reduces the complexity of the software and confusion of controls that the typical user may not understand. At this time, the user may also make manual changes using the controls that have been enabled prior to re-scanning the selected image.

In step 504, if the data type in the region of interest is gray scale photographic, then control passes to step 514 where scanner software 124 changes the output in exposure adjustment window 238. In step 516 scanner software 124 updates the resolution, scaling, output dimensions, and file size within status bar 222. In step 518 the controls in exposure adjustment window 238 are enabled for user input. The user may make manual changes using the controls that have been enabled prior to initiating a re-scan of the selected region of interest. In step 520 the controls in color adjustment window 240 and black and white threshold window 242 are disabled from user input and are grayed out.

In step 504, if the data type in the region of interest is color photographic, then in step 522 scanner software 124 changes the output in exposure adjustment window 238 and in color adjustment window 240. In step 524 scanner software 124 updates the resolution, scaling, output dimensions, and file size within status bar 222. In step 526 the controls in exposure adjustment window 238 and color adjustment window 240 are enabled for user input. The user may make manual changes using the controls that have been enabled prior to initiating a re-scan of the selected region of interest. In step 528 the controls in black and white threshold window 242 are disabled from user input and is grayed out. After any of steps 512, 520, or 528, FIG. 5 returns to FIG. 3.

Thus, the steps in steps 506, 508, 510, and 512; steps 514, 516, 518, and 520; and steps 522, 524, 526, and 528, automatically make many of the adjustments that the user would normally have to make manually in other prior art scanning systems after selecting a region of interest for scanning. The current invention reduces the complexity of the software user interface and confusion of controls that the typical user may not understand.

Figure 6:
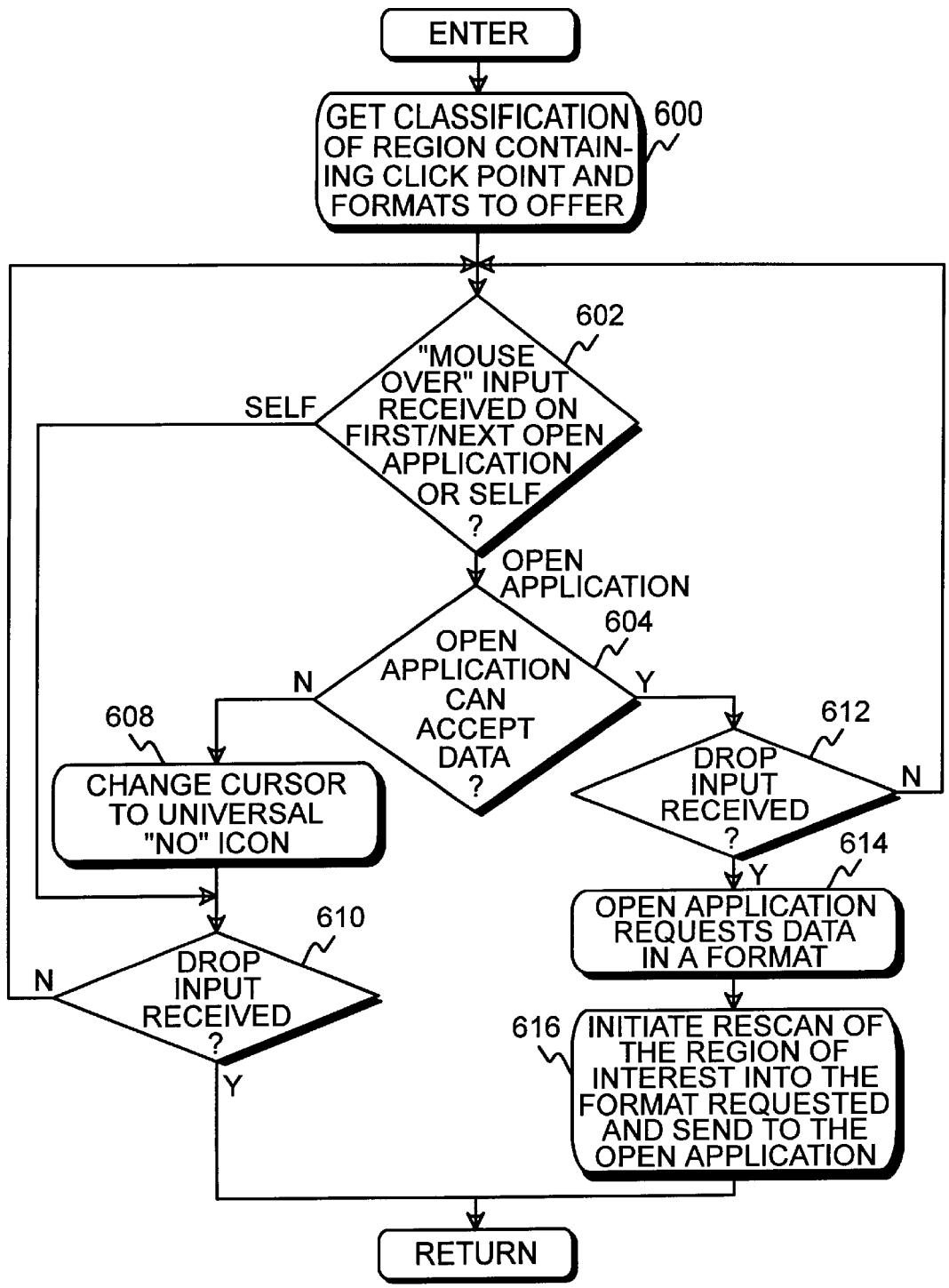
FIG. 6 shows a block diagram for performing an optimized final scan of the selected region utilizing the drag and drop feature from the Windows operating system.

FIG. 6 shows a block diagram for performing an optimized final scan of the selected region utilizing the drag and drop feature from the Windows operating system. Referring now to FIG. 6, in step 600, a data object is created and a list of one or more predetermined data formats provided in scanner software 124 is loaded into memory, based on the "mouse down" input signal selecting the region of interest displayed in monitor 110 (FIG. 1) whose data type, or classification, was determined in FIG. 4.

Step 602 determines if a "mouse over" input signal from graphical input device 108, which is handled by operating system 120 (FIG. 1) from a call made by scanner software 124, is received identifying an open application in monitor 110, or identifying scanner software window 200 itself. If the "mouse over" input signal is received identifying scanner software window 200, control passes to step 610. Step 610 then determines if a "mouse drop" input signal is received from graphical input device 108 selecting scanner software window 200 displayed in monitor 110. This indicates that the user decided not to initiate an optimized final scan. If the answer is yes, then FIG. 6 returns to FIG. 3. If the answer in step 610 is no, indicating no "mouse drop" signal was received, or that pointer 214 left scanner software window 200, then control returns to step 602.

If the "mouse over" input signal in step 602 is received identifying an open application, which was opened by a call to the application software, such as first software application 126 (FIG. 1), then operating system 120 notifies first software application 126 that pointer 214 has entered its window. Then in step 604 first software application 126 queries the list of predetermined data formats associated with the data object created in step 600. If one or more acceptable formats are found in the list generated in step 600, then first software application 126 lets operating system 120 know that it can receive the data and indicates a preferred format from the one or more acceptable formats. Step 612 then determines if a "mouse drop" input signal from graphical input device 108 is received, selecting first software application 126. If the answer is no, indicating no "mouse drop" signal was received, or that pointer 214 has left the first software application 126 window, then control returns to step 602. If the answer in step 612 is yes, indicating that a "mouse drop" input signal was received, then in step 614 first software application 126 makes a call to operating system 120 and requests the image data in the format it prefers. Then, in step 616, scanner software 124 sends a command to scanner 114 (FIG. 1) launching an optimized final scan of the document, and the image data from the optimized final scan is put into the format requested. The image data output from the optimized final scan for the region of interest portion of the document is sent to first software application 126, where the image data resides in the selected data format for further manipulation by the user within first software application 126. Control then returns to FIG. 3.

If in step 604 first software application 126 cannot find a format for the data that it can accept from the list generated in step 600, then step 608 changes the displayed pointer 214 to the universal "no" icon, a circle with a diagonal slash through it, indicating that a drop of the data object will not be allowed. Step 610 then determines if a "mouse drop" input signal is received from graphical input device 108 on first software application 126. If the answer is yes, then FIG. 6 returns to FIG. 3. If the answer in step 610 is no, then control returns to step 602.

FIG. 7 shows a block diagram for re-sizing the boundary of a selected area. Referring now to FIG. 7, step 700 determines if the click input with graphical input device 108, simultaneous with a control key held down, was received within, or outside of, selection marker 216 (FIG. 2). If the click input was within selection marker 216, indicating that the user wants a smaller area than what was automatically generated in FIG. 4, then step 704 finds a subset of the data elements within selection marker 216 immediately surrounding the click point, and establishes a new, smaller boundary around the subset of data elements. Then, in step 706, scanner software 124 performs classification analysis on the subset of data elements contained within the new boundary established by step 704. FIG. 7 then returns to FIG. 3.

If in step 700 the click input with graphical input device 108, simultaneous with a control key held down, was received outside of selection marker 216, indicating that the user wants a larger area than what was automatically generated in FIG. 4, control passes to step 702. Step 702 determines if the click input with graphical input device 108, simultaneous with a control key held down, was on white space or non-white space. If the click input was on white space, then step 712 expands the boundary to encompass the entire scanned document. FIG. 7 then returns to FIG. 3.

If the click input in step 702 was on non-white space, then step 708 makes an adjustment to the parameters used in the segmentation analysis. Then step 710 calls FIG. 4 to evaluate the data elements surrounding the click point with the new parameters to determine a superset of data elements and a new boundary, and to determine the data type of the superset of data elements within the new boundary. After returning from FIG. 4, FIG. 7 then returns to FIG. 3.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A user interface method, within a computer system, for selecting and classifying a region of a scanned document comprising:

(a) sending a signal to a scanner device to scan a document previously placed on said scanner device, wherein said scanner device is directed to scan said document using a preview scan mode to produce preview scan data of said document;

(b) displaying said preview scan data of said document in a preview box within a scanner software window of a monitor attached to said computer system;

(c) receiving a first click input from a graphical input device attached to said computer system, wherein said click input identifies a point on said monitor, said point being located within a first region of interest within said preview scan data within said preview box within said scanner software window of said monitor;

(d) segmenting said preview scan data within said first region of interest to locate a first boundary of said first region of interest; and (e) displaying a first selection marker around said first boundary of said first region of interest within said preview box within said scanner software window of said monitor.

2. A user interface method, within a computer system, for selecting and classifying a region of a scanned document according to claim 1 wherein step (b) further comprises steps (b1) through (b4):

(b1) displaying a status bar in said preview box in said scanner software window, wherein said preview box contains said preview scan data, and further wherein said status bar further comprises a classification display, a resolution display, a scaling display, an output dimension display, and a file size display;

(b2) displaying an exposure adjustment window in said scanner software window adjacent to said preview box;

(b3) displaying a color adjustment window in said scanner software window adjacent to said preview box; and (b4) displaying a black and white threshold window in said scanner software window adjacent to said preview box.

3. A user interface method, within a computer system, for selecting and classifying a region of a scanned document according to claim 1 wherein step (e) further comprises step (e1):

(e1) graying out all portions of said preview scan data that falls outside of said first selection marker in said preview box within said scanner software window of said monitor.

4. A user interface method, within a computer system, for selecting and classifying a region of a scanned document according to claim 1 further comprising:

(f) receiving a second click input from said graphical input device on white space within said preview scan data in said preview box within said scanner software window of said monitor; and (g) removing from display within said preview box within said scanner software window of said monitor said first selection marker from around said first region of interest.

5. A user interface method, within a computer system, for selecting and classifying a region of a scanned document according to claim 1 wherein step (d) further comprises step (d1):

(d1) locating said first boundary of said first region of interest by performing segmentation analysis on a plurality of data elements within said preview scan data, wherein said plurality of data elements surround a first data element derived from said first click input on said region of interest in said preview scan data displayed in said preview box within said scanner software window of said monitor, and further wherein said segmentation analysis determines a set of data elements derived from said plurality of data elements that comprise said first region of interest, wherein said first boundary comprises a set of outermost data elements of said set of data elements.

6. A user interface method, within a computer system, for selecting and classifying a region of a scanned document according to claim 5 further comprising:
(f) reducing said first boundary of said first region of interest, bounded by said first selection marker, by receiving right click input from said graphical input device on said first region of interest within said first selection marker in said preview box, causing a context menu to open up, and receiving click input from said graphical input device on a contract selection option in said context menu.

7. A user interface method, within a computer system, for selecting and classifying a region of a scanned document according to claim 5 further comprising:
(f) reducing said first boundary of said first region of interest, bounded by said first selection marker, by receiving key down input from a predetermined control key from a keyboard simultaneous with receiving a second click input from said graphical input device on said first region of interest within said first selection marker in said preview box.

8. A user interface method, within a computer system, for selecting and classifying a region of a scanned document according to claim 7 wherein step (f) further comprises steps (f1) and (f2), and further comprises steps (g) and (h):
(f1) finding a subset of data elements from said set of data elements of said first region of interest, wherein said subset of data elements surrounds a second data element derived from said second click input on said region of interest in said preview scan data displayed in said preview box within said scanner software window of said monitor;
(f2) determining a second boundary of said subset of data elements, wherein said second boundary comprises a set of outermost data elements of said subset of data elements;
(g) removing from display in said preview box said first selection marker; and
(h) displaying, in said preview box within said scanner software window of said monitor, a second selection marker around said second boundary from step (f2).

9. A user interface method, within a computer system, for selecting and classifying a region of a scanned document according to claim 5 further comprising:
(f) expanding said first boundary of said first region of interest, bounded by said first selection marker, by receiving right click input from said graphical input device on said first region of interest within said first selection marker in said preview box, causing a context menu to open up, and receiving click input from said graphical input device on an expand selection option in said context menu.

10. A user interface method, within a computer system, for selecting and classifying a region of a scanned document according to claim 5 further comprising:

(f) expanding said first region of interest, bounded by said first selection marker, by receiving key down input from a predetermined control key from a keyboard simultaneous with receiving a second click input with said graphical input device on an adjacent region of interest in said preview scan data, wherein said adjacent region of interest lies outside of said first region of interest bounded by said first selection marker in said preview box within said scanner software window.

11. A user interface method, within a computer system, for selecting and classifying a region of a scanned document according to claim 10 wherein step (f) further comprises steps (f1) through (f3), and further comprises steps (g) and (h):
(f1) adjusting at least one segmentation parameter of said segmentation analysis;
(f2) finding a super set of data elements by performing said segmentation analysis with said at least one adjusted segmentation parameter on a plurality of data elements surrounding a second data element derived from said second click input on said adjacent region of interest in said preview scan data displayed in said preview box within said scanner software window of said monitor;
(f3) determining a second boundary of said super set of data elements, wherein said second boundary comprises a set of outermost data elements of said super set of data elements;
(g) removing from display in said preview box said first selection marker; and
(h) displaying, in said preview box within said scanner software window of said monitor, a second selection marker around said second boundary from step (f2).

12. A user interface method, within a computer system, for selecting and classifying a region of a scanned document according to claim 5 wherein step (d1) further comprises step (d1a):
(d1a) performing said segmentation analysis linearly, wherein said first selection marker placed around said first boundary of said first region of interest in said preview box within said scanner software window is a rectangular bounding box.

13. A user interface method, within a computer system, for selecting and classifying a region of a scanned document according to claim 5 wherein step (d1) further comprises step (d1a):
(d1a) performing said segmentation analysis non-linearly, wherein said first selection marker placed around said first boundary of said first region of interest in said preview box within said scanner software window is a non-rectangular lasso selection marker.

14. A user interface method, within a computer system, for selecting and classifying a region of a scanned document according to claim 5 wherein step (d1) further comprises step (d1a):
(d1a) performing classification analysis on said set of data elements of said first region of interest.

15. A user interface method, within a computer system, for selecting and classifying a region of a scanned document according to claim 14 wherein step (d1a) further comprises step (d1a1):
(d1a1) determining from said classification analysis that said first region of interest is a text region or a black and white line art region.

16. A user interface method, within a computer system, for selecting and classifying a region of a scanned document according to claim 15 wherein step (e) further comprises steps (e1) through (e4):

(e1) updating said black and white threshold window with output pertaining to said first region of interest;

(e2) updating said classification display, said resolution display, said scaling display, said output dimension display, and said file size display, within said status bar display, with output pertaining to said first region of interest;

(e3) enabling a plurality of black and white threshold window controls for user input; and (e4) disabling a plurality of exposure adjustment window controls and a plurality of color adjustment window controls from user input.

17. A user interface method, within a computer system, for selecting and classifying a region of a scanned document according to claim 14 wherein step (d1a) further comprises step (d1a1):

(d1a1) determining from said classification analysis that said first region of interest is a gray scale photographic region.

18. A user interface method, within a computer system, for selecting and classifying a region of a scanned document according to claim 17 wherein step (e) further comprises steps (e1) through (e4):

(e1) updating said exposure adjustment window with output pertaining to said first region of interest;

(e2) updating said classification display, said resolution display, said scaling display, said output dimension display, and said file size display, within said status bar display, with output pertaining to said first region of interest;

(e3) enabling a plurality of exposure adjustment window controls for user input; and (e4) disabling a plurality of color adjustment window controls and a plurality of black and white threshold window controls from user input.

19. A user interface method, within a computer system, for selecting and classifying a region of a scanned document according to claim 14 wherein step (d1a) further comprises step (d1a1):

(d1a1) determining from said classification analysis that said first region of interest is a color photographic region.

20. A user interface method, within a computer system, for selecting and classifying a region of a scanned document according to claim 19 wherein step (e) further comprises steps (e1) through (e4):

(e1) updating said exposure adjustment window and said color adjustment window with output pertaining to said first region of interest;

(e2) updating said classification display, said resolution display, said scaling display, said output dimension display, and said file size display, within said status bar display, with output pertaining to said first region of interest;

(e3) enabling a plurality of exposure adjustment window controls and a plurality of color adjustment window controls for user input; and (e4) disabling a plurality of black and white threshold window controls from user input.

21. A system for selecting and classifying a region of a scanned document, said system comprising:

a scanner device having a document placed in position to be scanned by said scanner device;

a monitor having a scanner software window;

a graphical input device;

a processing device; and scanner software, operating within said processing device, for sending a signal to said scanner device to scan said document using a preview scan mode to produce preview scan data of said document, for copying said preview scan data of said document from said scanner to said monitor to be displayed in a preview box within said scanner software window, for receiving a first click input from said graphical input device to identify a point on said monitor, said point being located within a first region of interest within said preview box within said scanner software window of said monitor, for performing segmentation analysis on said preview scan data within said first region of interest to locate a first boundary of said first region of interest, and for displaying a first selection marker around said first boundary of said first region of interest within said preview box within said scanner software window of said monitor.

22. A system for selecting and classifying a region of a scanned document according to claim 21 wherein said scanner software, after displaying said first selection marker, further grays out all portions of said preview scan data that falls outside of said first selection marker in said preview box within said scanner software window of said monitor.

23. A system for selecting and classifying a region of a scanned document according to claim 21 wherein when said scanner software receives a second click input from said graphical input device on white space within said preview scan data in said preview box within said scanner software window of said monitor, said scanner software removes said first selection marker from around said first region of interest within said preview box within said scanner software window of said monitor.

24. A system for selecting and classifying a region of a scanned document according to claim 21 wherein said scanner software locates said first boundary of said first region of interest by performing segmentation analysis on a plurality of data elements within said preview scan data, wherein said plurality of data elements surround a first data element identified by said first click input on said region of interest in said preview scan data displayed in said preview box within said scanner software window of said monitor, and further wherein said segmentation analysis determines a set of data elements derived from said plurality of data elements that comprise said first region of interest, wherein said first boundary comprises a set of outermost data elements of said set of data elements.

25. A system for selecting and classifying a region of a scanned document according to claim 21 wherein when said scanner software receives right click input from said graphical input device on said first region of interest within said first selection marker in said preview box, causing a context menu to open up, and receives click input from said graphical input device on a contract selection option in said context menu, said first boundary of said first region of interest, bounded by said first selection marker, is reduced.

26. A system for selecting and classifying a region of a scanned document according to claim 21 wherein when said scanner software receives right click input from said graphical input device on said first region of interest within said first selection marker in said preview box, causing a context menu to open up, and receives click input from said graphical input device on an expand selection option in said context menu, said first boundary of said first region of interest, bounded by said first selection marker, is expanded.

27. A system for selecting and classifying a region of a scanned document according to claim 21, further comprising:

a keyboard;

wherein when said scanner software receives key down input from a predetermined control key within said keyboard, in combination with receiving a second click input from said graphical input device on said first region of interest within said first selection marker in said preview box within said scanner software window, said scanner software reduces said first boundary of said first region of interest bounded by said first selection marker.

28. A system for selecting and classifying a region of a scanned document according to claim 21, further comprising:

a keyboard;

wherein when said scanner software receives key down input from a predetermined control key within said keyboard, in combination with receiving a second click input from said graphical input device on an adjacent region of interest in said preview box within said scanner software window, wherein said adjacent region of interest lies outside of said first region of interest bounded by said first selection marker in said scanner software window, said scanner software expands said first region of interest bounded by said first selection marker.

29. A system for selecting and classifying a region of a scanned document according to claim 21 wherein said scanner software further performs classification analysis on said first region of interest.

30. A system for selecting and classifying a region of a scanned document according to claim 29 wherein said scanner software determines from said classification analysis that said first region of interest is a text region or a black and white line art region.

31. A system for selecting and classifying a region of a scanned document according to claim 29 wherein said scanner software determines from said classification analysis that said first region of interest is a gray scale photographic region.

32. A system for selecting and classifying a region of a scanned document according to claim 29 wherein said scanner software determines from said classification analysis that said first region of interest is a color photographic region.

* * * * *